(12) United States Patent
Freund

(10) Patent No.: US 6,168,235 B1
(45) Date of Patent: Jan. 2, 2001

(54) RECLINER CONTROL MECHANISM FOR A SEAT ASSEMBLY

(75) Inventor: Roger Freund, Port Sydney (CA)

(73) Assignee: Dura Global Technologies Inc., Rochester Hills, MI (US)

( * ) Notice: Under 35 U.S.C. 154(b), the term of this patent shall be extended for 0 days.

(21) Appl. No.: 09/192,846

(22) Filed: Nov. 16, 1998

(51) Int. Cl.$^7$ .................................................. B60N 2/02
(52) U.S. Cl. ........................................ 297/362; 297/361.1
(58) Field of Search ............................... 297/362, 361.1, 297/354.1, 354.12

(56) References Cited

U.S. PATENT DOCUMENTS

| 3,667,804 | * | 6/1972 | Yasui et al. . | |
| 4,302,047 | | 11/1981 | Esser | 297/362 |
| 5,209,637 | | 5/1993 | Reubeuze | 475/176 |
| 5,755,491 | | 5/1998 | Baloche et al. | 297/362 |

FOREIGN PATENT DOCUMENTS

| 2560832 | * | 8/1976 | (FR) | 297/362 |
| 2495800 | * | 6/1982 | (FR) | 297/362 |
| 1445947 | * | 8/1976 | (GB) | 297/362 |

* cited by examiner

Primary Examiner—Milton Nelson, Jr.
(74) Attorney, Agent, or Firm—Robert K. Roth

(57) ABSTRACT

A vehicle seat assembly includes a seat bottom and a seat back supported for pivotal movement relative to the seat bottom such that seat back position can be adjusted to a variety of reclined positions with respect to the seat bottom. The seat includes a manual or electrical actuator which provides input to a control assembly that pivots the seat back with respect to the seat bottom. The control assembly includes an epicycloide gear mechanism with a first gear supported on the first seat member and a second gear supported on the second seat member. The second gear has a plurality of gear teeth that selectively mesh with a plurality of gear teeth on the first gear. The first gear teeth have a non-epicycloide tooth profile and the second gear teeth have an epicycloide tooth profile. An input member defines an axis of rotation and provides rotational input to the second gear. The input member is an eccentric input shaft having a geometric center that is spaced apart from the axis of rotation. This eccentricity causes the second gear teeth to move into engagement with the first gear teeth. When the input shaft is rotated in a first direction, the second gear is caused to rotate in a second direction, opposite from the first direction, resulting in the seat back pivoting with respect to the seat bottom.

12 Claims, 3 Drawing Sheets

RECLINER CONTROL MECHANISM FOR A SEAT ASSEMBLY

BACKGROUND OF THE INVENTION

This application relates to a control assembly that moves a seat member between a plurality of angular positions. The control assembly has a pair of gears and an input shaft. The input shaft provides rotational input to one of the gears and moves the other gear into engagement with the first gear to cause the seat member to move.

Control assemblies with gearing mechanisms are often used in seat assemblies for controlling movement between seat members. The control assembly can be actuated by either a mechanical actuator, an electrical actuator, or an electromechanical actuator. Typically a first seat member, such as a seat bottom, is fixed to seat track assembly, and a second seat member, such as a seat back, is supported with respect to the seat bottom for pivotal movement relative to the seat bottom. The control assembly selectively controls the pivotal movement of the seat back and allows the seat back to be moved between a plurality of reclined positions relative to the seat bottom.

Known gear mechanisms in control assemblies are often complex, requiring a great number of parts which increases assembly time. Also, these gear mechanisms often do not have a smooth transition between desired seat angle positions. Thus, when a seat occupant changes the seat back angle from one position to another, the seat back will jerk or snap into the next position. This can damage gear teeth and can significantly decrease the fatigue life of the gearing mechanism.

Thus, it is desirable to have a control assembly with a gearing mechanism that can provide improved smooth seat adjustment capability without requiring a great number of parts. It is also desirable to have such a control assembly that is durable and robust yet requires few parts so that assembly cost and overall assembly weight can be reduced.

SUMMARY OF THE INVENTION

In a disclosed embodiment, a vehicle seat assembly includes a first seat member and a second seat member supported for pivotal movement relative to the first seat member. The position of the second seat member can be adjusted to a variety of angular positions with respect to the first seat member. The seat includes a control assembly that causes the second seat member to pivot with respect to the first seat member. The control assembly includes an epicycloide gear mechanism with a first gear supported on the first seat member and a second gear supported on the second seat member. The second gear has a plurality of gear teeth that selectively mesh with a plurality of gear teeth on the first gear. The first gear teeth have a non-epicycloide tooth profile and the second gear teeth have an epicycloide tooth profile. An input member defines an axis of rotation about which the second gear rotates. The input member moves the second gear teeth into engagement with the first gear teeth and provides rotational input to the second gear causing the second gear teeth to react against the first gear teeth resulting in the second seat member pivoting with respect to the first seat member.

In a further embodiment, the input member is an eccentric input shaft having a geometric center that is eccentrically mounted or spaced apart from, the axis of rotation. This eccentricity causes the second gear teeth to move into engagement with the first gear teeth. When the input shaft is rotated in a first direction, the second gear is caused to rotate in a second direction, opposite from the first direction, resulting in the seat back pivoting with respect to the seat bottom.

The subject control assembly provides a simplified control mechanism that is light-weight, durable, easily installed, easily maintained, and is inexpensive. These and other features can be understood from the following specification and drawings.

DETAILED DESCRIPTION OF THE PREFERRED EMBODIMENT

Figure 1:
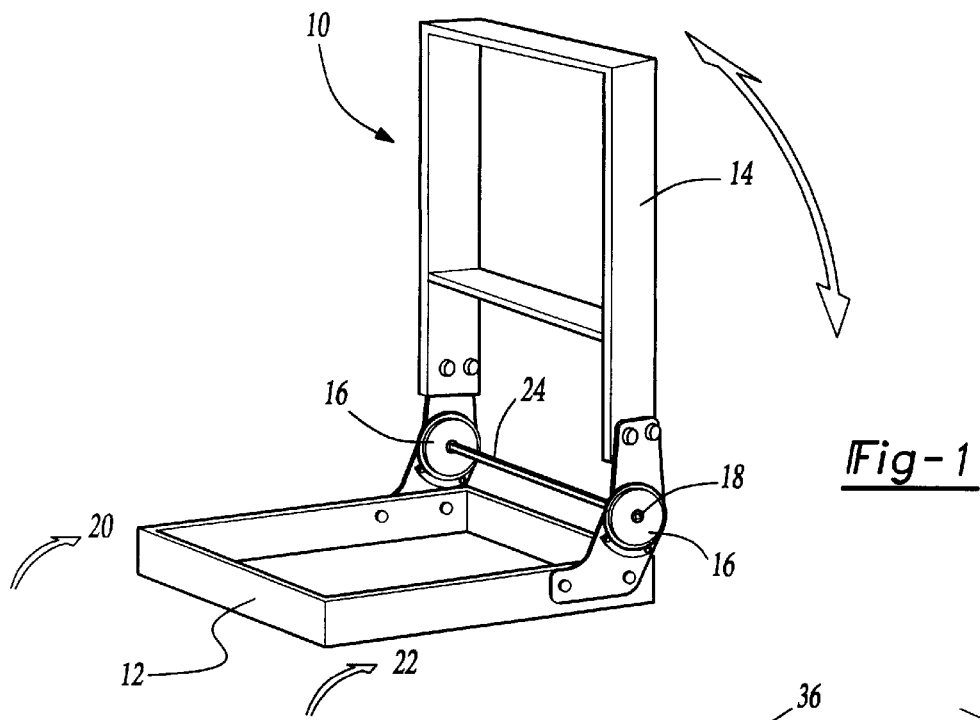
FIG. 1 is a perspective view of a seat assembly incorporating the subject control assembly.

A vehicle seat assembly is shown generally at 10 in FIG. 1. The seat assembly 10 includes a first seat member 12, such as a seat bottom or a seat-pan and a second seat member 14, such as a seat back, supported with respect to the seat bottom 12. The seat bottom 12 and seat back 14 are shown as frames so that the present invention can be easily visualized. The seat back 14 is supported for pivotal movement relative to the seat bottom 12 such that the position of the seat back 14 can be adjusted to a variety of angular positions with respect to the seat bottom 12, as indicated by the arrow shown in FIG. 1.

A control assembly 16 is used to move the seat back 14 between various angular seat positions relative to the seat bottom 12. An actuator 18 is used by the seat occupant (not shown) to selectively adjust the position of the seat back 14 and provides input to the control assembly 16. The control assembly 16 can be used with a manual recliner, where the actuator could be any of well known mechanisms in the art such as a knob or lever. The control assembly 16 could also be used with a power recliner, where the actuator would be a switch that powers an external gear motor (not shown).

Preferably, there are control assemblies on both the inboard 20 and outboard 22 sides of the seat assembly 10. These control assemblies are preferably identical, however, only one assembly typically has an actuator 18 that is used by the seat occupant. Once the actuator 18 has been actuated by the seat occupant, a control mechanism 24, such as a bar member, is used to actuate the opposite side control assembly 16.

Figure 2:
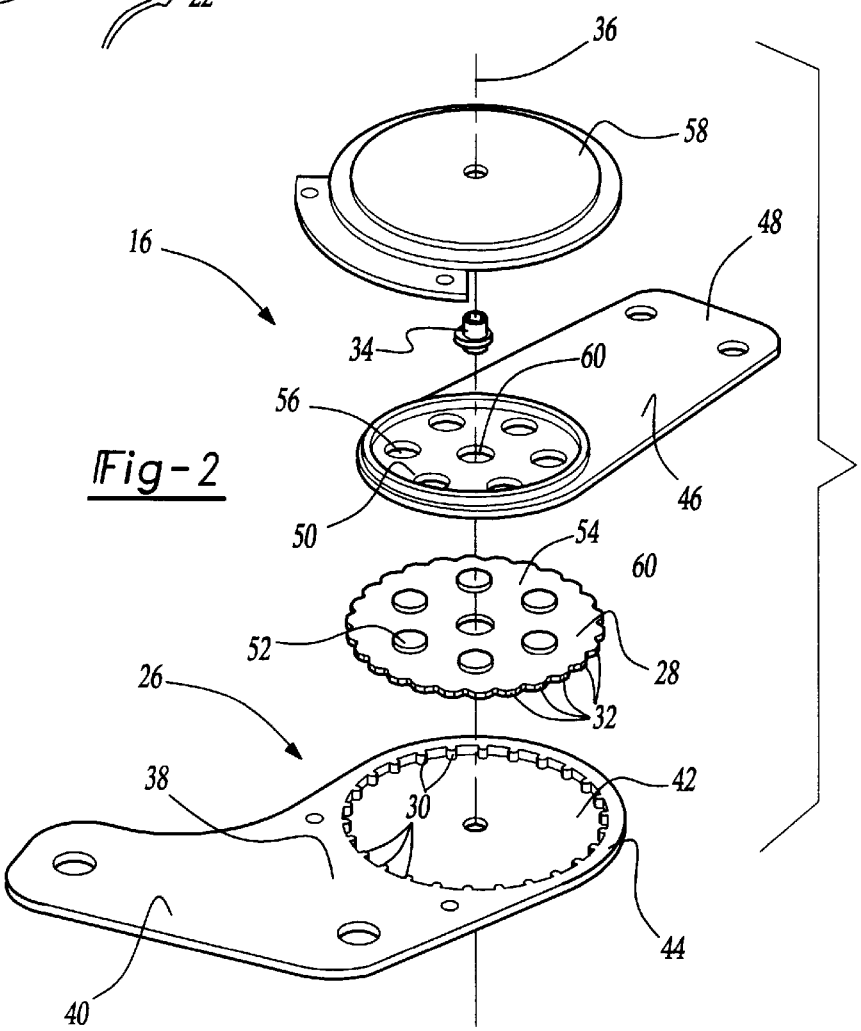
FIG. 2 is an exploded perspective view of the control assembly.

As shown in FIG. 2, the control assembly 16 includes a first gear 26 that is supported on the first seat member 12 and a second gear 28 that is supported on the second seat member 14. While the preferred embodiment discloses the first gear 26 being attached to the seat bottom 12 and the second gear 28 being attached to the seat back 14, it should be understood that the reverse orientation could also be used. The first gear member 26 has a plurality of internal first gear teeth 30 and the second gear 28 has a plurality of external second gear teeth 32. An input member 34 defines an axis of rotation 36 about which the second gear 28 rotates. The input member 34 is caused to rotate by input received from the actuator 18.

In operation, the input member 34 moves the second gear teeth 32 into engagement with the first gear teeth 30 and provides rotational input to the second gear 28 causing the second gear teeth 32 to react against the first gear teeth 30 resulting in the second seat member 14 pivoting with respect to the first seat member 12. This dual function performed by the input member 34 is caused by an eccentricity in the input member 34. The eccentricity also results in reverse rotation of the second gear 28. When the input member 34 is rotated in a first direction the second gear 28 is caused to rotate in a second direction opposite from the first direction. The eccentricity of the input member 34 will be discussed in greater detail below.

Another beneficial feature resulting from this control assembly 16 is the capability of speed reduction. The rotational input speed of the input member 34 is high compared to the rotational output speed of the second gear 28. This speed is controlled by the ratio which is the number of teeth 32 on the second gear 28.

As shown in FIG. 2, the first gear 26 is a ring gear housing 38 having a bracket portion 40 and a ring gear portion 42. The bracket portion 40 attaches the ring gear housing 38 to the first seat member 12. Thus, the ring gear portion 42 is fixed with respect to the first seat member 12, i.e. the ring gear portion 42 cannot rotate. The ring gear portion 42 has a ring 44 defining a ring circumference wherein the plurality of first gear teeth 30 are supported on the ring 44 and extend inwardly toward the axis of rotation 36. The bracket portion 40 and ring gear portion 42 are preferably integrally formed as a single piece, however, two (2) separate pieces could be used.

The second gear 28 is a disc gear defining a disc circumference that is less than the ring circumference, i.e., the disc gear 28 is smaller than the ring gear 42. The plurality of the second gear teeth 32 extend outwardly from the disc gear 28 for engagement with the first gear teeth 30.

The control assembly 16 includes a bracket 46 having first 48 and second 50 attachment portions. The first attachment portion 48 attaches the bracket 46 to the second seat member 14 and the second attachment portion 50 attaches the disc gear 28 to the bracket 46. The disc gear 28 preferably includes at least one extension 52, six (6) are shown, extending outwardly from a disc face 54. The second attachment portion 50 preferably includes at least one aperture 56, six (6) are shown, for receiving the extension 52. The extensions 52 are inserted into the apertures 56 to lock the disc gear 28 to the bracket 46. While the bracket 46 and disc gear 28 are shown as two (2) separate pieces, it should be understood that they could be formed integrally as one piece in order to reduce the overall number of parts in the control assembly 16.

The bracket 46 and disc gear 28 include central apertures 60 that are aligned to receive the input member 34. The input member 34 is inserted into the apertures 60 where it is allowed to rotate with respect to the disc gear 28.

The control assembly 16 also includes a cover 58 for substantially enclosing the disc gear 28 within the ring gear housing 38. The cover 58 is preferably fastened to the ring gear housing 38 by means well known in the art. The cover 58 prevents dirt and other contaminants from entering the control assembly 16 and interfering with the operation of the first 26 and second 28 gears.

Figure 3A:
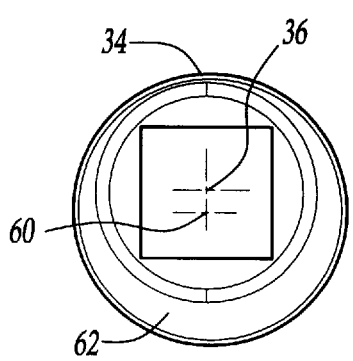
FIG. 3A is a top view of the input member.

As shown in FIG. 3A, the input member 34 is preferably an eccentric input shaft having a geometric center 60 that is spaced apart from the axis of rotation 36. This eccentricity causes the second gear teeth 32 to move into engagement with the first gear teeth 30. The first gear teeth 30 are fixed, i.e., cannot rotate, because of the attachment of the bracket portion 40 of the ring gear housing 38 to the seat bottom 12. Because the first gear teeth 30 are fixed, the reaction of the second gear teeth 32 against the first gear teeth 30 cause the second gear 28 to rotate in a direction opposite from the direction the input member 34 is rotating.

Figure 3B:
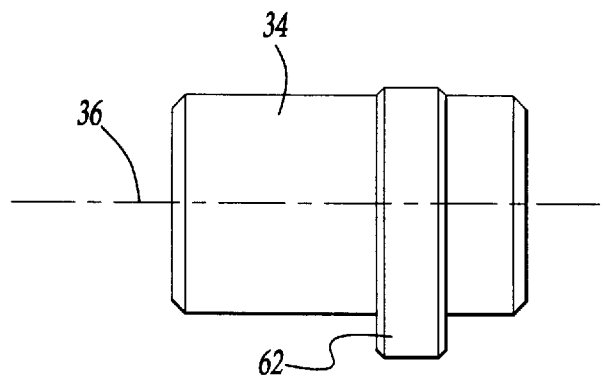
FIG. 3B is a side view of the input member shown in FIG. 3A.

The eccentric input shaft 34 includes an engaging portion 62, shown more clearly in FIG. 3B, which moves the second gear 28 between a disengaged and an engaged position. In the disengaged position the second gear teeth 32 do not engage the first gear teeth 30 and in the engaged position the second gear teeth 32 engage the first gear teeth 30.

Figure 5:
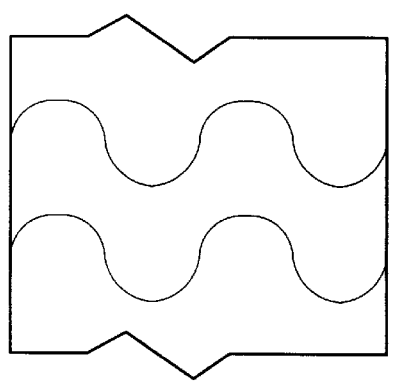
FIG. 5 is a prior art gear tooth profile.

The first 26 and second 28 gears form an epicycloide gear mechanism. In an epicycloide gear, the gear tooth profile is generated by unwinding a point on a base circle on the outside of the arc of the base circle. This epicycloide tooth profile is different than a cycloide or hypocycloide tooth profile. A cycloide gear has a tooth profile that is generated by unwinding a point on a circle on a straight line. A hypocycloide gear has a tooth profile that is generated by unwinding a point on a base circle on the inside arc of the base circle. An example of a hypocycloide gear mechanism is shown in FIG. 5.

Figure 6A:
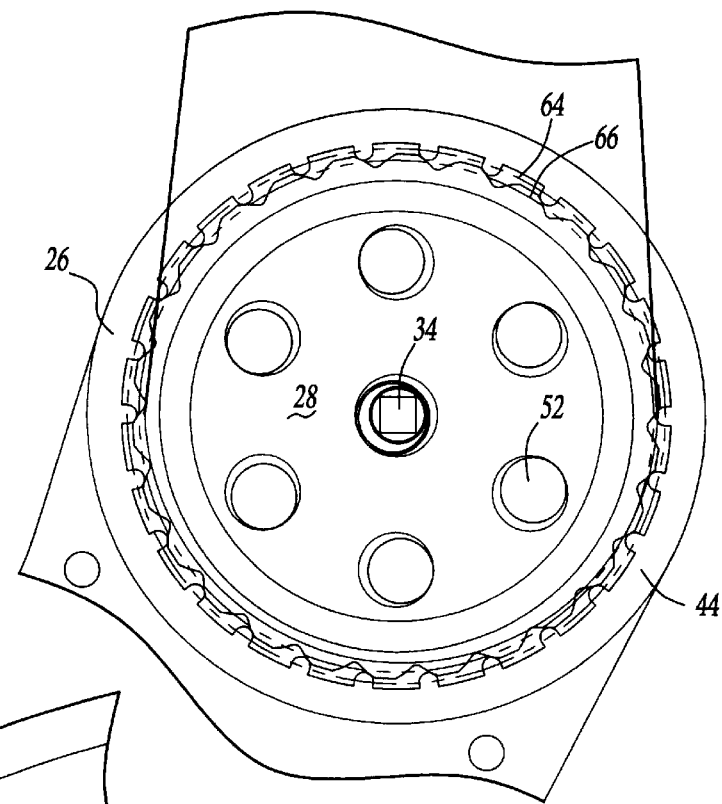
FIG. 6A is an enlarged view of the epicycloide gear mechanism shown in FIG. 4.
Figure 6B:
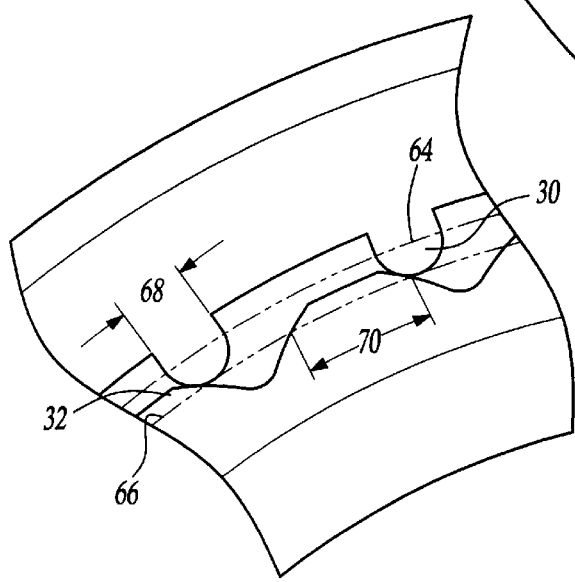
FIG. 6B is an enlarged view, partially cutaway, of the gear teeth profiles shown in FIG. 6A.

In the preferred embodiment, the first gear teeth 30 have an non-epicycloide tooth profile and the second gear teeth 32 have an epicycloide tooth profile as shown in FIGS. 6A and 6B. The toothing on the first gear 26 has an outline of convex circular sections, which are in contact with the cycloid flanks of the second gear 28. The toothing of the second gear 28 on both flanks is formed by convex curves that are equidistant from a cycloid. Concave circular sections are forming the root and convex circular sections define the tip diameter. This combination offers smooth transitions and the seat back is pivoted relative to the seat bottom. This combination is also more durable than known gearing mechanisms.

The first gear 26 defines a first pitch diameter 64 and the second gear 28 defines a second pitch diameter 66 that is less than the first pitch diameter 64. The first gear teeth 30 each have a first chordal thickness 68 and the second gear teeth 32 each have a second chordal thickness 70. A chord is a straight line joining two points on a curve. The chordal thickness is the length of the chord subtended by the circular thickness arc, i.e., the dimension obtained when a gear-tooth caliper is used to measure the thickness at the pitch circle.

In the preferred embodiment, the first chordal thickness 68 is less than the second chordal thickness 70. The second chordal thickness 70 can be more than twice that of the first chordal thickness 68, however, other ratios could be used.

In the preferred embodiment, the first gear teeth 30 are smaller than the second gear teeth 32. The smaller first gear teeth 30 are spaced around a larger circumference gear 26 than are the larger gear teeth 32. This means that the distance between the first gear teeth 30 is larger than the distance between the second gear teeth 32.

Figure 4:
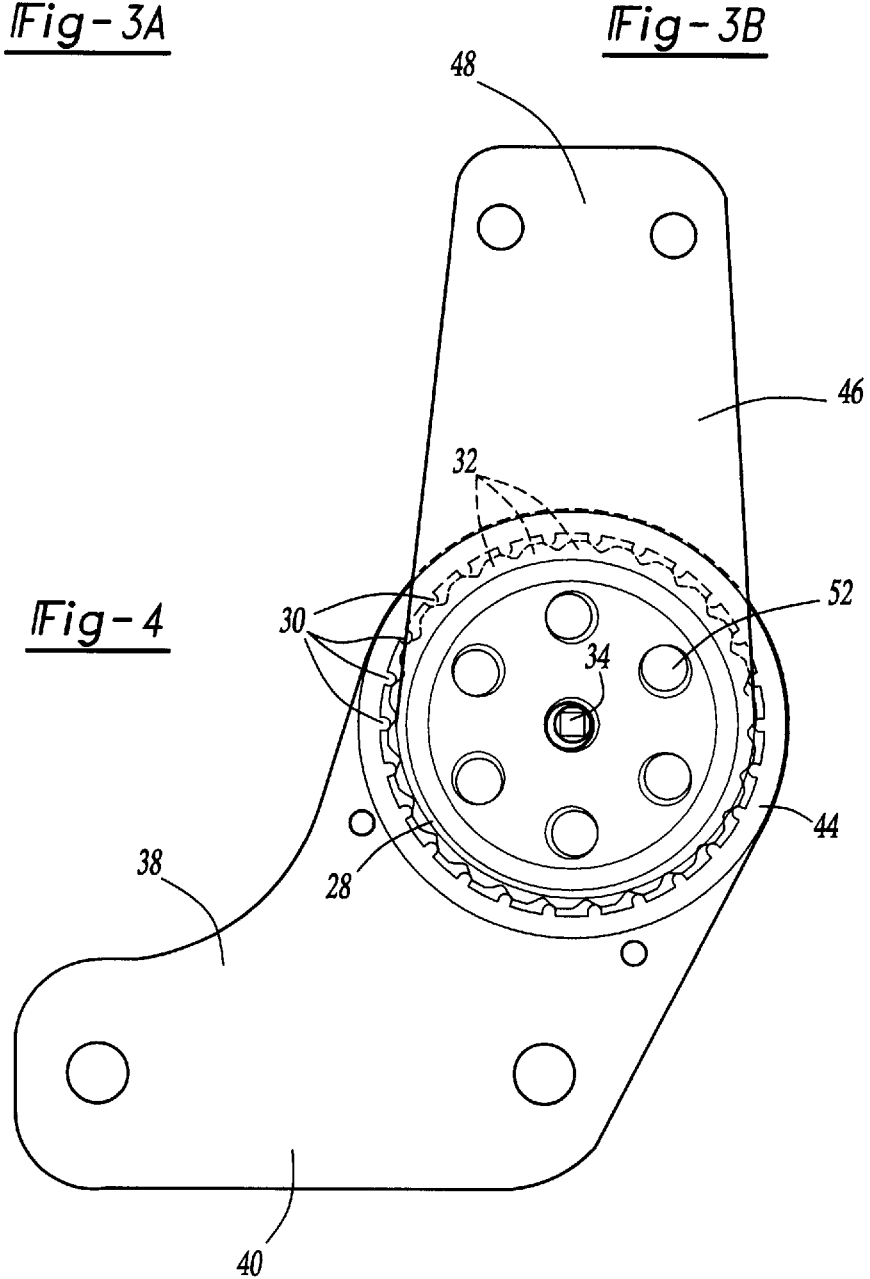
FIG. 4 is a side view of the control assembly in the engaged position.

In operation, the eccentricity of the input member 34 via the engaging portion 62 causes the disc gear 28 to move into the engaged position with the ring gear portion 42, shown in FIG. 4. For example, when the input member 34 is rotated in a clockwise direction with respect to the disc gear, the engaging portion 62 causes the teeth 32 of disc gear 28 to move into engagement with the teeth 30 of the ring gear 42.

The reaction of the teeth 32 of the disc gear 28 against the fixed teeth 30 of the ring gear 42 results in the disc gear 28 being rotated in a counter-clockwise direction. As the disc gear 28 rotates the seat back 14 is pivoted from a first reclined position to a second reclined position. The opposite result occurs when the input member 34 is rotated in a counterclockwise direction, i.e. the disc gear 28 is cause to rotate in a clockwise direction, allowing the seat back 14 to be pivoted back from the second reclined position to the first reclined position.

Preferred embodiments of this invention have been disclosed, however, a worker of ordinary skill in the art would recognize that certain modifications would come within the scope of this invention. For that reason the following claims should be studied to determine the true scope and content of this invention.

What is claimed is:

1. A vehicle seat assembly comprising:
   a first seat member;
   a second seat member supported for pivotal movement relative to said first seat member; and
   a control assembly for selectively moving said second seat member between a plurality of angular positions with respect to said first seat member, said control assembly including a first gear supported on said first seat member and having a plurality of first gear teeth with a non-epycloide profile a second gear supported on said second seat member and having a plurality of second gear teeth with an epicycloide profile, and an input member defining an axis of rotation, said input member for moving said second gear teeth into engagement with said first gear teeth and for providing rotational input to said second gear causing said second gear teeth to react against said first gear teeth resulting in said second seat member pivoting with respect to said first seat member.

2. An assembly as recited in claim 1 wherein said input member is an eccentric input shaft having a geometric center that is spaced apart from said axis of rotation.

3. An assembly as recited in claim 2 wherein said eccentric input shaft includes an engaging portion for moving said second gear between a disengaged position where said second gear teeth do not engage said first gear teeth and an engaged position where said second gear teeth engage said first gear teeth.

4. An assembly as recited in claim 2 including a seat actuator for providing rotational input to said eccentric input shaft such that when said input shaft is rotated in a first direction said second gear rotates in a second direction opposite from said first direction.

5. An assembly as recited in claim 2 wherein said first gear is a ring gear housing having a bracket portion and a ring gear portion, said bracket portion for fixing said housing to said first seat member and said ring gear portion having a ring defining a ring circumference wherein said plurality of first gear teeth are supported on said ring and extend inwardly toward said axis of rotation.

6. An assembly as recited in claim 5 wherein said second gear is a disc gear defining a disc circumference that is less than said ring circumference and said plurality of said second gear teeth extending outwardly from said disc gear.

7. An assembly as recited in claim 6 wherein said first gear teeth are circumferentially spaced apart from one another by a first predetermined distance around said ring circumference and said second gear teeth are circumferentially spaced apart from one another by a second pre-determined distance around said disc circumference, said second predetermined distance being less than said first predetermined distance.

8. An assembly as recited in claim 7 wherein said ring gear portion defines a first pitch diameter and said disc gear defines a second pitch diameter, and wherein said first gear teeth each have a first chordal thickness measured at said first pitch diameter and said second gear teeth each have a second chordal thickness measured at said second pitch diameter, said second chordal thickness being greater than said first chordal thickness.

9. An assembly as recited in claim 6 including a cover for substantially enclosing said disc gear within said ring gear housing.

10. A vehicle seat assembly comprising:
    a seat bottom;
    a seat back supported for pivotal movement relative to said seat bottom;
    a first gear assembly supported on said seat bottom and having a plurality of first gear teeth each having a non-epicycloide profile and being circumferentially spaced apart from one another by a first predetermined distance;
    a second gear assembly supported on said seat back and having a plurality of second gear teeth each having an epicycloide profile and being circumferentially spaced apart from one another by a second predetermined distance that is less than said first predetermined distance; and
    an input member defining an axis of rotation, said input member for providing rotational input to said second gear assembly causing said second gear teeth to react against first gear teeth resulting in said seat back pivoting with respect to said seat bottom.

11. An assembly as recited in claim 10 wherein said input member is an eccentric input shaft having a geometric center that is spaced apart from said axis of rotation.

12. An assembly as recited in claim 10 wherein said first gear teeth each have a first chordal thickness and said second gear teeth each have a second chordal thickness, said second chordal thickness being greater than said first chordal thickness.

* * * * *